(12) United States Patent
Li

(10) Patent No.: US 12,206,498 B2
(45) Date of Patent: Jan. 21, 2025

(54) FEEDBACK SEQUENCE TRANSMISSION METHOD AND APPARATUS, AND DEVICE AND READABLE STORAGE MEDIUM

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 17/775,061

(22) PCT Filed: Nov. 6, 2019

(86) PCT No.: PCT/CN2019/116045
§ 371 (c)(1),
(2) Date: May 6, 2022

(87) PCT Pub. No.: WO2021/087816
PCT Pub. Date: May 14, 2021

(65) Prior Publication Data
US 2022/0407623 A1 Dec. 22, 2022

(51) Int. Cl.
*H04L 1/1607* (2023.01)
*H04L 1/18* (2023.01)
*H04L 1/1812* (2023.01)
*H04L 5/00* (2006.01)
*H04W 4/40* (2018.01)

(52) U.S. Cl.
CPC .......... *H04L 1/1607* (2013.01); *H04L 1/1812* (2013.01); *H04L 5/0053* (2013.01); *H04W 4/40* (2018.02)

(58) Field of Classification Search
CPC ... H04L 1/1607; H04L 1/1812; H04L 5/0053; H04L 1/1825; H04L 1/1858; H04L 1/0001; H04W 4/40; G08G 1/094
See application file for complete search history.

(56) References Cited

U.S. PATENT DOCUMENTS 8,908,797 B2 12/2014 Jeckeln
10,021,723 B2 7/2018 Liu et al.
(Continued)

FOREIGN PATENT DOCUMENTS

CN 102457979 A 5/2012
CN 103378949 A 10/2013
(Continued)

OTHER PUBLICATIONS

International Search Report of PCT Application No. PCT/CN2019/116045 dated Jun. 30, 2022 with English translation, (5p).
(Continued)

*Primary Examiner* — Abdullahi E Salad
(74) *Attorney, Agent, or Firm* — Arch & Lake LLP

(57) ABSTRACT

A method for transmitting a feedback sequence includes receiving, by a feedback terminal, data on a data channel. The data corresponds to a reception power and a transmission power. The feedback terminal determines the number of sending times to send a feedback sequence based on the reception power and the transmission power. The feedback terminal sends the feedback sequence based on the number of sending times.

16 Claims, 3 Drawing Sheets

--- receives data on a data channel, the data corresponds to a reception power and a transmission power — 301 determines the number of sending times to send a feedback sequence based on the reception power and the transmission power — 302 sends the feedback sequence with the number of sending times — 303

(56) References Cited

U.S. PATENT DOCUMENTS

| | | | |
|---|---|---|---|
| 2013/0235949 A1 | 9/2013 | Jeckeln | |
| 2015/0327180 A1 | 11/2015 | Ryu et al. | |
| 2016/0088660 A1* | 3/2016 | Liu | H04L 5/0005 370/252 |
| 2019/0081739 A1* | 3/2019 | Nammi | H04L 1/08 |
| 2019/0230562 A1 | 7/2019 | Fan et al. | |
| 2021/0081739 A1* | 3/2021 | Yazaki | H01Q 9/24 |

FOREIGN PATENT DOCUMENTS

| | | |
|---|---|---|
| CN | 104144517 A | 11/2014 |
| CN | 108933747 A | 12/2018 |
| CN | 109151969 A | 1/2019 |
| WO | 2012058975 A1 | 5/2012 |

OTHER PUBLICATIONS

Extended European Search Report of EP Application No. 19951286.4 dated Jul. 17, 2023, (9p).
First Office Action of Indian Application No. 202247031958 dated Sep. 30, 2022 with partial English translation (6).

\* cited by examiner

FEEDBACK SEQUENCE TRANSMISSION METHOD AND APPARATUS, AND DEVICE AND READABLE STORAGE MEDIUM

CROSS-REFERENCE TO RELATED APPLICATION

This application is a U.S. national phase application of International Application No. PCT/CN2019/116045, filed on Nov. 6, 2019, the content of which is hereby incorporated by reference in its entirety for all purposes.

TECHNICAL FIELD

The disclosure relates to a field of communication technologies, and more particularly, to a method, apparatus, device, and readable storage medium for transmitting a feedback sequence.

BACKGROUND

Vehicle wireless communication technology, such as Vehicle to Everything (V2X), is a new generation of information communication technology that connects the vehicle with everything, where V represents the vehicle, and X represents any object that interacts with the vehicle. Currently, X mainly includes vehicles, people, traffic roadside infrastructure and networks. Information interaction Modes of the V2X include Vehicle to Vehicle (V2V), Vehicle to Infrastructure (V2I), Vehicle to Pedestrian (V2P), Vehicle and Network (V2N).

SUMMARY

In one aspect, a method for transmitting a feedback sequence is provided. The method includes:
- receiving, by a feedback terminal, data on a data channel, in which the data corresponds to a reception power and a transmission power;
- determining, by the feedback terminal, the number of sending times to send a feedback sequence based on the reception power and the transmission power; and
- sending, by the feedback terminal, the feedback sequence based on the number of sending times.

In another aspect, a method for transmitting a feedback sequence is provided. The method includes:
- receiving, by a receiving terminal feedback sequences at a physical resource position of the feedback sequences; and
- obtaining, by the receiving terminal, control information fed back by a feedback terminal based on filtered by the feedback sequences according to an activation threshold.

In yet another aspect, a terminal is provided. The terminal includes:
- a processor;
- a transceiver connected to the processor;
- in which the processor is configured to load and execute executable instructions to implement the method for transmitting the feedback sequence as described in the above embodiments of the disclosure.

In yet another aspect, a computer-readable storage medium is provided. The computer-readable storage medium has at least one instruction, at least one program, code set or instruction set stored thereon. The above-mentioned at least one instruction, at least one program, code set or instruction set are loaded and executed by the processor to implement the method for transmitting the feedback sequence as described in the above embodiments of the disclosure.

BRIEF DESCRIPTION OF THE DRAWINGS

In order to illustrate the technical solutions according to the embodiments of the disclosure clearly, the drawings that are used in the description of the disclosure will be described below. Obviously, the drawings in the following description are only some embodiments of the disclosure. For those of ordinary skill in the art, other drawings can be obtained from these drawings without creative effort.

DETAILED DESCRIPTION

In order to clearly understand the objectives, technical solutions and advantages of the disclosure, the embodiments of the disclosure will be described in detail below with reference to the accompanying drawings.

Figure 1:
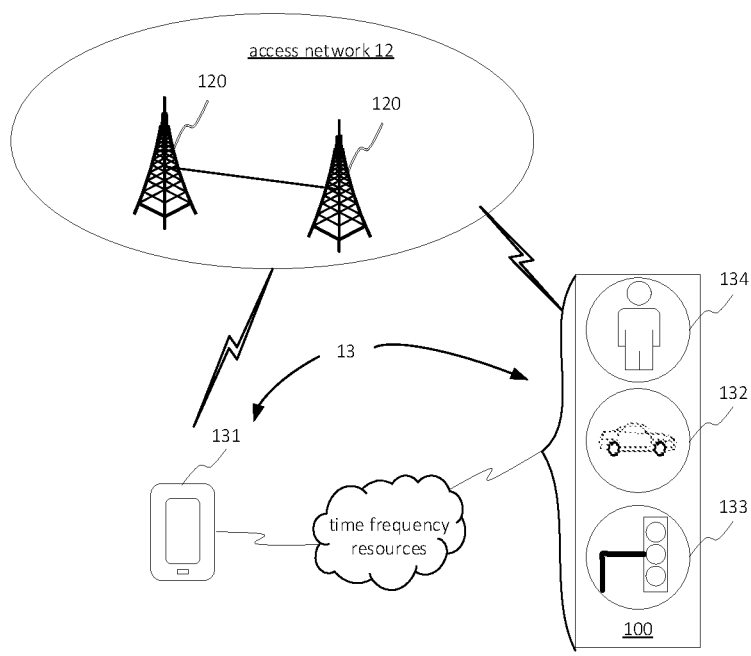
FIG. 1 is a block diagram illustrating a communication system supporting sidelink communication in accordance with an embodiment of the disclosure.

FIG. 1 is a block diagram illustrating a communication system in accordance with an embodiment of the disclosure. The communication system may include: an access network 12 and a terminal 13.

The access network 12 includes several access network devices 120. The access network device 120 may be a base station. The base station refers to a device deployed in an access network to provide a wireless communication function for a terminal. The base station may include various forms of macro base station, micro base station, relay station, access point, etc. In systems using different radio access technologies, the names of devices with a base station function may be different. For example, in Long Term Evolution (LTE) systems, the device is called eNodeBs or eNBs. In 5G New Radio (NR) systems, the device is called gNodeB or gNB. With the evolution of the communication technology, the name "base station" may change. For the convenience of description, in the embodiments of the disclosure, the above-mentioned devices that can provide a wireless communication function for a terminal are collectively referred to as "access network device".

The terminal 13 may include various devices with the wireless communication function, such as hand-held devices, vehicle-mounted devices, wearable devices, computing devices or other processing devices connected to the wireless modem, as well as various forms of user equipment (UE), mobile stations (MS), terminal device, etc. For the convenience of description, the above-mentioned devices are collectively referred to as "user equipment (UE)". The access network device 120 and the UE 13 communicate with each other through a certain air interface technology, such as a Uu interface.

Vehicle wireless communication technology, such as Vehicle to Everything (V2X), is a new generation of information communication technology that connects the vehicle with everything, where V represents the vehicle, and X represents any object that interacts with the vehicle. Currently, X mainly includes vehicles, people, traffic roadside infrastructure and networks.

In the embodiments of the disclosure, the UE 13 can be vehicle 131, another vehicle 132, infrastructure 133, or pedestrian 134.

Vehicle to Vehicle (V2V) refers to the communication between the vehicle 131 and another vehicle 132. The vehicle on one side sends relevant information of the vehicle to the vehicle on the opposing side. The relevant information includes driving speed, geographic position, driving direction and driving status, etc.

Vehicle to Infrastructure (V2I) refers to the communication between the vehicle 131 and the infrastructure 133. The infrastructure 133 refers to all infrastructures encountered by the vehicle during driving, including traffic lights, bus stops, buildings, tunnels, or other facilities.

Vehicle to Pedestrian (V2P) refers to the communication between the vehicle 131 and the pedestrian 134. The pedestrian generally refers to electronic devices with mobile communication capabilities carried by pedestrians, such as mobile phones and wearable devices. The wearable devices include smart bracelets, smart watches, and smart rings.

In the embodiments of the disclosure, the vehicle 131 is referred to as the first terminal, and another vehicle 132, the infrastructure 133, and the pedestrian 134 are all referred to as the second terminal for illustration. The roles of these two can also be interchanged, which is not limited.

Alternatively, the above communication system can be an NR system or a subsequent evolution system.

In the NR system, the Uplink Control Information (UCI) is information carried on the Physical Uplink Control Channel (PUCCH) or the Physical Uplink Share Channel (PUSCH), and sent by the UE to the base station. The UCI contains response information of downlink data, such as Hybrid Automatic Repeat request Acknowledge character (HARQ-ACK), which is configured to feed back to the base station whether the downlink data has been correctly received. The HARQ-ACK includes a positive response, such as an Acknowledge character (ACK), and a negative response, such as a non-Acknowledge character (NACK), where the ACK is configured to indicate that the UE has correctly received the downlink data, and the NACK is configured to indicate that the UE has not received the downlink data.

Alternatively, the NR PUCCH supports five formats. The PUCCH format 0 carries 1 to 2 UCI information bits. During transmission, all 12 subcarriers of one Resource Block (RB) in the frequency domain are occupied, and 1 to 2 Orthogonal Frequency Division Multiplexing (OFDM) symbols in the time domain are occupied. The PUCCH format 0 carries the UCI information in a manner of sequence selecting. That is, n UCI information bits are carried through $2^n$ candidate sequences.

Figure 2:
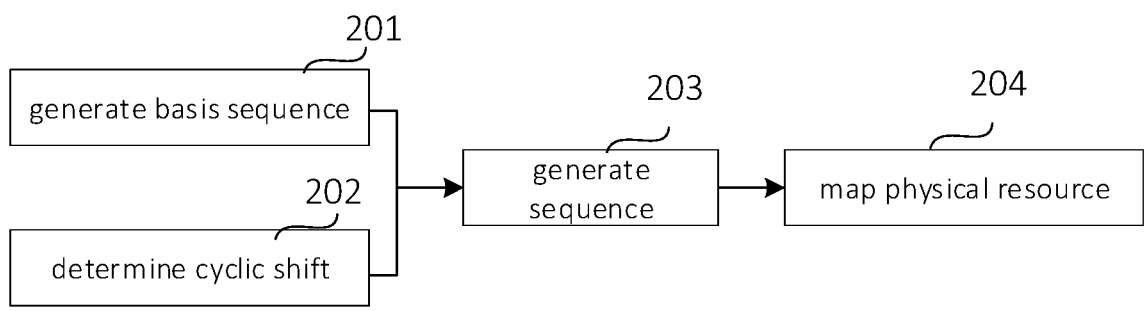
FIG. 2 is a schematic diagram illustrating a process for determining UCI information in accordance with an embodiment of the disclosure.

Alternatively, carrying the UCI information in a manner of sequence selecting can ensure single-carrier characteristics during uplink information transmission, thereby reducing the Peak to Average Power Ratio (PAPR) and improving the coverage of PUCCH format 0. FIG. 2 shows the process of determining the UCI information. As illustrated in FIG. 2, a base sequence is generated 201, and a cyclic shift is determined 202. After a sequence to be sent is generated 203 based on the base sequence and the cyclic shift, physical resource mapping is performed 204 on the sequence to be sent.

In the NR system, in order to improve resource utilization efficiency, the $2^n$ candidate sequences are generated based on different cyclic shifts of a computer-generated sequence of length of 12. Different cyclic shifts of the computer-generated sequence are orthogonal, that is, different UEs select corresponding cyclic shifts from the $2^n$ candidate sequences according to the UCI information to be transmitted, and multiplex the same RB. The base station detects the sequence sent by the UE from the candidate sequences to determine the UCI sent by the UE.

In some examples, the following sequence generation equation can be used for the PUCCH format 0:

$$x(l \cdot N_{sc}^{RB} + n) = r_{u,v}^{(\alpha,\delta)}(n)$$

$$n = 0, 1, \ldots N_{sc}^{RB} - 1$$

$$l = \begin{cases} 0, & \text{for one-}OFDM \text{ symbol } PUCCH \\ 0, & \text{for two-}OFDM \text{ symbol } PUCCH \end{cases}$$

where, l represents an index of the OFDM symbol corresponding to the UCI, n represents an index of a subcarrier occupied by the OFDM symbol corresponding to the UCI, $N_{SC}^{RB}$ represents the number of subcarriers equaling to 12, i.e., PUCCH format 0 occupies 12 subcarriers of one RB in the frequency domain, $r_{u,v}^{(\alpha,\delta)}(n)$ represents the sequence which is obtained through a following equation:

$$r_{u,v}^{(\alpha,\delta)}(n) = e^{j\alpha n}\overline{r}_{u,v}(n), 0 \leq n < M_{ZC}$$

where, $\alpha$ in $r_{u,v}^{(\alpha,\delta)}(n)$ represents the cyclic shift of a user, $$\alpha_l = \frac{2\pi}{N_{sc}^{RB}}\left((m_0 + m_{cs} + n_{cs}(n_{s,f}^\mu, l+l'))\right) \mod N_{sc}^{RB},$$

$n_{cs}$ represents the index of the subcarrier occupied by the OFDM, l' represents a bias value, $n_{s,f}^\mu$ represents a biased index, $\alpha$ is determined based on both an initial cyclic shift $m_0$ of the PUCCH resource and the specific cyclic shift $m_{cs}$ of the HAR1-ACK. For the HARQ-ACK of 1 bit, values of $m_{cs}$ are shown in Table 1 as follows:

TABLE 1

| HARQ-ACK value | 0 | 1 |
|---|---|---|
| sequence cyclic shift | $m_{cs} = 0$ | $m_{cs} = 6$ |

For the HARQ-ACK of 2 bit, values of $m_{cs}$ are shown in Table 2 as follows:

TABLE 2

| HARQ-ACK value | {0, 0} | {0, 1} | {1, 1} | {1, 0} |
|---|---|---|---|---|
| sequence cyclic shift | $m_{cs} = 0$ | $m_{cs} = 3$ | $m_{cs} = 6$ | $m_{cs} = 9$ |

In the related art, in the NR V2X system, when feeding back the HARQ-ACK, the Physical Sidelink Feedback Channel (PSFCH) is designed to carry the feedback ACK or NACK information. However, there is no power control mechanism in the V2X system. When the receiving terminal receives with different reception powers the UCIs fed back by multiple feedback terminals upon the UCIs arrive at the receiving terminal, sequences received with lower reception power may be overwhelmed by sequences received with higher reception power, which makes it impossible to interpret the feedback sequences received with lower reception power.

Figure 3:
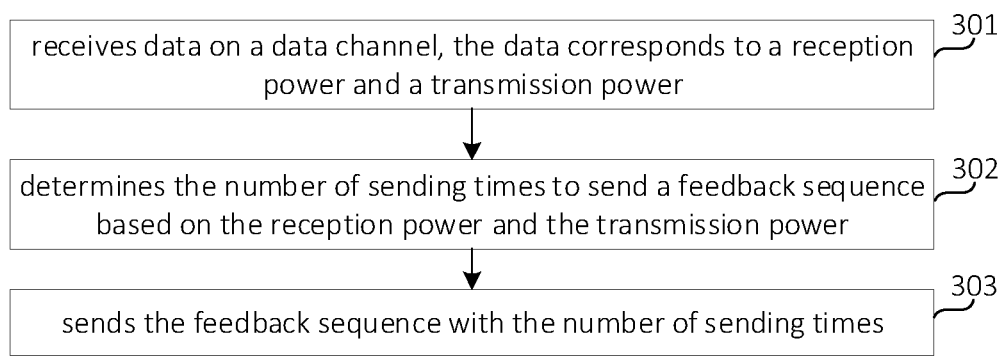
FIG. 3 is a flowchart illustrating a method for transmitting a feedback sequence in accordance with an embodiment of the disclosure.

FIG. 3 is a flowchart illustrating a method for transmitting a feedback sequence in accordance with an embodiment of the disclosure. The method is applied to a feedback terminal as an example for description. As illustrated in FIG. 3, the method includes the following.

At block 301, data on a data channel is received. The data corresponds a reception power and a transmission power.

In some examples, after receiving the data on the data channel, it is determined whether to provide feedback regarding the data. When requiring to provide the feedback regarding the data, it is determined whether to provide positive feedback, negative feedback or both the positive feedback and the negative feedback.

The reception power refers to the power when the feedback terminal receives the data on the data channel, and the transmission power refers to the power when a receiving terminal that receives the feedback sends the data through the data channel. The transmission power is set in advance in the receiving terminal. The receiving terminal may send the transmission power to the feedback terminal by sending a notification signaling to the feedback terminal. The reception power is determined when the feedback terminal receives the data on the data channel.

Generally, when the distance between the receiving terminal and the feedback terminal is farther, the path loss value of the transmitted data on the data channel is larger, that is, the gap between the transmission power and the reception power is larger.

At block 302, the number of sending times to send the feedback sequence is determined based on the reception power and the transmission power.

Alternatively, the path loss value is determined based on the reception power and the transmission power, and the corresponding number of sending times is determined based on the path loss value.

Alternatively, the path loss value is a difference obtained by subtracting the transmission power from the reception power.

Alternatively, in determining the number of sending times based on the path loss value, any one of the following methods can be adopted.

Method 1, the path loss value is compared with a feedback threshold. When the path loss value is greater than the feedback threshold, a first number of sending times is determined as the number of sending times to send the feedback sequence. When the path loss value is not greater than the feedback threshold, a second number of sending times is determined as the number of sending times to send the feedback sequence. The first number of sending times is greater than the second number of sending times.

Alternatively, the feedback threshold is a threshold pre-configured in the feedback terminal. When the data on the data channel is received, the feedback terminal determines the feedback threshold according to the pre-configuration, and compares the path loss value with the feedback threshold. Alternatively, the feedback threshold is a threshold obtained through simulation.

Method 2, the path loss value is compared with a path loss range. Different path loss ranges correspond to different numbers of sending times. For example, a first path loss range corresponds to 2 sending times, a second path loss range corresponds to 3 sending times, and a third path loss range corresponds to 4 sending times. By comparing the path loss value and the path loss range, when the path loss value is within the second path loss range, the number of sending times corresponding to the path loss value is 3. An upper limit of the first path loss range is smaller than a lower limit of the second path loss range, and an upper limit of the second path loss range is smaller than a lower limit of the third path loss range.

At block 303, the feedback sequence is sent based on the number of sending times.

Alternatively, the number of sending times is configured to indicate the number of times of repeatedly sending the feedback sequence, that is, retransmitting the feedback sequence based on the number of sending times. It is understandable that, the meaning of "based on" is repeat the sending the number of sending times. That is, "the feedback sequence is sent based on the number of sending times" means sending the feedback sequence the number of sending times.

Alternatively, the physical resource position used when sending the feedback sequence is pre-configured. For example, the physical resource position used when sending the feedback sequence may be configured by the access network device for the feedback terminal or may be configured by the receiving terminal for the feedback terminal. The receiving terminal is a terminal for receiving the feedback sequence fed back from the feedback terminal. The feedback terminal receives a first configuration signaling sent by the access network device or the receiving terminal, where the first configuration signaling includes an information field for configuring the physical resource position used when sending the feedback sequence. The receiving terminal is an opposite terminal of the feedback terminal, and is configured to receive the feedback sequence sent by the feedback terminal. The execution method at the receiving terminal will be described in detail below, which is not repeated here. Alternatively, when the first configuration signaling is sent by the receiving terminal to the feedback terminal, the receiving terminal may configure the physical resource position for the feedback terminal based on a feedback feature. The feedback feature includes a distance feature and/or the number of types. The distance feature is configured to represent a distance relationship between the receiving terminal and the feedback terminal. The number of bytes is configured to represent the number of bytes of the feedback sequence fed back by the feedback terminal.

Alternatively, the physical resource position used when the feedback terminal sends the feedback sequence can be determined based on the distance relationship between the feedback terminal and the receiving terminal and/or the number of bytes of the feedback sequence fed back by the feedback terminal. For example, the physical resource position can be determined in at least one of the following ways.

Way 1, the receiving terminal determines the physical resource position used for sending the feedback sequence by the feedback terminal based on the distance relationship between the feedback terminal and the receiving terminal and/or the number of bytes of the feedback sequence fed back by the feedback terminal, and sends the first configuration signaling to the feedback terminal. The first configuration signaling includes an information field configured to indicate the physical resource position used when sending the feedback sequence.

Way two, the access network device sends a second configuration signaling to the receiving terminal and the feedback terminal. The second configuration signaling includes an information field configured to indicate a correspondence between the feedback features and the physical resource positions. The feedback terminal determines the physical resource position used for sending the feedback sequence based on the feedback feature. The feedback feature include the distance feature and/or the number of bytes. That is, the second configuration signaling includes the first information field for indicating the correspondence between the distance features and the physical resource positions, or the second configuration signaling includes the second information field for indicating the number of bytes and the physical resource positions, or the second information field further includes a third information field indicating a correspondence between the distance features, the number of types and the physical resource positions. When the second configuration signaling includes the above-mentioned first information field, the feedback terminal determines the physical resource position based on the distance relationship from the receiving terminal. When the second configuration signaling includes the above-mentioned second information field, the feedback terminal determines the physical resource position based on the number of bytes of the feedback sequence. When the second configuration signaling includes the above-mentioned third information field, the feedback terminal determines the physical resource position based on the distance relationship from the receiving terminal and the number of bytes of the feedback sequence.

In conclusion, with the method for transmitting the feedback sequence in accordance with embodiments of the disclosure, the number of sending times to send the feedback sequence is determined based on the transmission power and the reception power of data on the data channel, and the feedback sequence is repeatedly transmitted based on the number of sending times. That is, when the transmission power and the reception power indicate that there is a large power loss of the feedback sequence during the transmission process, by repeatedly transmitting the feedback sequence many times, a problem that the sequence received with the lower reception power is overwhelmed by the sequence received with the higher reception power such that the feedback sequence received with the lower reception power cannot be obtained can be avoided. In this way, the accuracy of sending the feedback sequence is improved.

Figure 4:
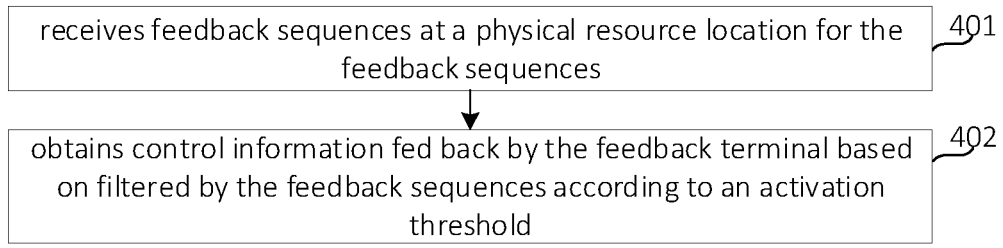
FIG. 4 is a flowchart illustrating a method for transmitting a feedback sequence in accordance with an embodiment of the disclosure.

When receiving the feedback sequence, the receiving terminal needs to interpret the feedback sequence in an iterative manner. FIG. 4 is a flowchart illustrating a method for transmitting a feedback sequence in accordance with an embodiment of the disclosure. For example, the method is applied to a receiving terminal as an example. As illustrated in FIG. 4, the method includes the following.

At block 401, feedback sequences are received at a physical resource position for the feedback sequence.

Alternatively, the physical resource position includes a time-domain resource position and a frequency-domain resource position. Therefore, receiving the feedback sequence includes receiving the feedback sequence at time-domain resource positions and frequency-domain resource positions where it is possible to receive the feedback sequence. Alternatively, the same physical resource position may carry feedback sequences fed back by multiple feedback terminals.

If there are k physical resource positions where it is possible to have the feedback sequences fed back, the feedback sequences are received on the k physical resource positions, where k>1.

At block 402, control information fed back by the feedback terminal is obtained based on filtered by the feedback sequences according to an activation threshold.

Alternatively, a positive correlation operation is performed on n first feedback sequences received at a first physical resource position to obtain a correlation result set. Each first feedback sequence corresponds to a first correlation value in the correlation result set, n is a positive integer. Each first correlation value in the correlation result set is compared with a first threshold to filter the n first feedback sequences to obtain first feedback sequences sent at the first physical resource position. Alternatively, when the first correlation value is greater than the first threshold, the first feedback sequence corresponding to the first correlation value is determined as a first feedback sequence sent at the first physical resource position. The first feedback sequences at the first physical resource position and the feedback sequences at the subsequent physical resource position are iteratively filtered to obtain the control information fed back by the feedback terminal.

Alternatively, in iteratively filtering the feedback sequences, the n first feedback sequences at the first physical resource position and the n second feedback sequences at the second physical resource position are superimposed to obtain n superimposition sequences. When the power value of an i-th superimposition sequence is greater than a second threshold, the corresponding i-th first feedback sequence is subtracted from the i-th superimposition sequence. When the power value of the i-th superimposition sequence is not greater than the second threshold, a sum of a first correlation value corresponding to the i-th first feedback sequence and a second correlation value corresponding to the i-th second feedback sequence is compared with a first threshold to determine feedback sequences sent at the first physical resource position and the second physical resource position.

Alternatively, when the sum of the first correlation value corresponding to the i-th first feedback sequence and the second correlation value corresponding to the i-th second feedback sequence is greater than the first threshold, the i-th first feedback sequence and the i-th second feedback sequence are determined as the sent feedback sequences.

Alternatively, for the feedback sequences at the m-th physical resource position, the n feedback sequences at the m-th physical resource position are superimposed with the superimposition sequences obtained through the (m−1)-th iteration to obtain n updated superimposition sequences, where m is greater than 1 and less than or equal to the number of physical resource positions. When the power value of the i-th superimposition sequence is greater than the second threshold, the i-th superimposition sequence obtained through the (m−1)-th iteration is subtracted from the i-th superimposition sequence. When the power value of the i-th superimposition sequence is not greater than the second threshold, a sum of a third correlation value corresponding to the i-th superimposition sequence obtained through the (m−1)-th iteration and a fourth correlation value corresponding to the i-th superimposition sequence at the m-th physical resource position is compared with the first threshold to determine the feedback sequence sent at the m-th physical resource position. Alternatively, when the iteration is completed, the control information fed back by the feedback terminal based on the superimposition sequence.

The filtering process is as follows.

Step ONE, at the first physical resource position, the positive correlation operation is performed on the feedback sequence and the received sequences in turn based on possible combinations of sequences, to obtain the correlation result set {R1, R2, . . . , Rn}, where n represents the number of sequences at the first physical resource position.

Step TWO, a correlation value corresponding to a first feedback sequence received at the first physical resource position is compared with an activation threshold $\partial$. When the correlation value is greater than the first threshold $\partial$, it indicates that a corresponding sequence has been sent.

Step THIRD, a first feedback sequence at the first physical resource position and a second feedback sequence at the second physical resource position are superimposed to obtain a superimposition sequence, and it is determined whether the power value of the superimposition sequence exceeds a second threshold $\partial 1$. If the power value of the superimposition sequence exceeds the second threshold, the first feedback sequence determined through the step TWO is subtracted from the superimposition sequence to obtain an updated sequence W. If the power value of the superimposition sequence does not exceed the second threshold, the step TWO is repeatedly performed without subtracting the first feedback sequence determined through the step TWO, and it is determined whether the sum of the correlation values of the first feedback sequence and the second feedback sequence is greater than the first threshold $\partial$. When the sum of the correlation values of the first feedback sequence and the second feedback sequence is greater than the first threshold $\partial$, the first feedback sequence and the second feedback sequence are determined as the sent sequences.

Step FOUR, a third feedback sequences on the third physical resource position is superimposed with the updated sequence W to obtain a superimposition sequence W. It is determined whether the power value corresponding to the superimposition sequence W exceeds the second threshold $\partial 1$. If the power value corresponding to the superimposition sequence W exceeds the second threshold, the sequence determined through the Step three is subtracted from the W to obtain an updated sequence W. If the power value corresponding to the superimposition sequence W does not exceed the second threshold, the step TWO is executed repeatedly without subtracting the first feedback sequence determined through the step THREE, and it is determined whether the feedback sequence has been sent at the position not exceeding the transmission power based on the sum of correlation values.

Step FIVE, the above operations are repeated until all physical resource positions where it is possible to transmit the feedback sequence are traversed to obtain the feedback information of all possible UEs.

In conclusion, with the method for transmitting a feedback sequence in accordance with embodiments of the disclosure, the feedback sequences are interpreted in the iterative manner, a problem that the sequence received with the lower reception power is overwhelmed by the sequence received with the higher reception power such that the feedback sequence received with the lower reception power cannot be obtained can be avoided. In this way, the accuracy of sending the feedback sequence is improved.

Figure 5:
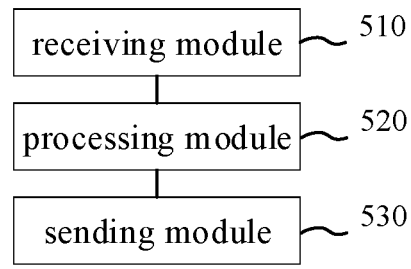
FIG. 5 is a block diagram illustrating an apparatus for transmitting a feedback sequence in accordance with an embodiment of the disclosure.

FIG. 5 is a block diagram illustrating an apparatus for transmitting a feedback sequence in accordance with an embodiment of the disclosure. The apparatus is applied to a feedback terminal as an example for description. As illustrated in FIG. 5, the apparatus includes a receiving module 510, a processing module 520 and a sending module 530.

The receiving module 510 is configured to receive data on a data channel. The data corresponds to a reception power and a transmission power.

The processing module 520 is configured to determine the number of sending times to send the feedback sequence according to the reception power and the transmission power.

The sending module 530 is configured to send the feedback sequence based on the number of sending times.

In an embodiment, the processing module 520 is further configured to determine a path loss value based on the reception power and the transmission power, and determine the number of sending times based on the path loss value.

In an embodiment, the processing module 520 is further configured to determine a first number of sending times as the number of sending times to send the feedback sequence when the path loss value is greater than a feedback threshold.

Alternatively, the processing module 520 is further configured to determine a second number of sending times as the number of sending times to send the feedback sequence when the path loss value is not greater than the feedback threshold.

The first number of sending times is greater than the second number of sending times.

In an embodiment, the processing module 520 is further configured to determine a physical resource position for sending the feedback sequence.

The sending module 530 is further configured to send the feedback sequence based on the number of sending times at the physical resource position.

In an embodiment, the receiving module 510 is further configured to receive a first configuration signaling sent by an access network device or a receiving terminal. The first configuration signaling includes an information field configured to indicate the physical resources position.

In an embodiment, the receiving module 510 is further configured to receive a second configuration signaling sent by an access network device. The second configuration signaling includes an information field configured to indicate a corresponding to feedback features and the physical resource positions.

The processing module 520 is further configured to determine the physical resource position for sending the feedback sequence based on the feedback features. The feedback feature includes distance and/or the number of bytes. The distance is configured to represent a distance relationship between the receiving terminal and the feedback terminal. The number of bytes is configured to represent the number of bytes of the feedback sequence sent by the feedback terminal.

In conclusion, with the apparatus for transmitting the feedback sequence in accordance with embodiments of the disclosure, the number of sending times to send the feedback sequence is determined based on the transmission power and the reception power of data on the data channel, and the feedback sequence is repeatedly transmitted based on the number of sending times. That is, when the transmission power and the reception power indicate that there is a large power loss of the feedback sequence during the transmission process, by repeatedly transmitting the feedback sequence many times, a problem that the sequence received with the lower reception power is overwhelmed by the sequence received with the higher reception power such that the feedback sequence received with the lower reception power cannot be obtained can be avoided. In this way, the accuracy of sending the feedback sequence is improved.

Figure 6:
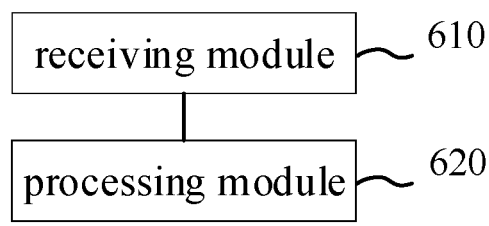
FIG. 6 is a block diagram illustrating an apparatus for transmitting a feedback sequence in accordance with an embodiment of the disclosure.

FIG. 6 is a block diagram illustrating an apparatus for transmitting a feedback sequence in accordance with an embodiment of the disclosure. The apparatus is applied to a receiving terminal as an example for description. As illustrated in FIG. 6, the apparatus includes a receiving module 610 and a processing module 620.

The receiving module 610 is configured to receive feedback sequences at a physical resource position for the feedback sequences.

The processing module 620 is configured to obtain control information fed back by the feedback terminal based on filtered by the feedback sequences according to an activation threshold.

In an embodiment, the activation threshold includes a first threshold. The processing module 620 is further configured to perform a positive correlation operation on the n first feedback sequences received at the first physical resource position, to obtain a correlation result set. Each first feedback sequence corresponds to a first correlation value in the correlation result set, and n is a positive integer. The processing module 620 is further configured to compare the first correlation value in the correlation result set with the first threshold, to filter the first feedback sequences to obtain sent first feedback sequences at the first physical resource position; iteratively filter the first feedback sequences at the first physical resource position and feedback sequences at subsequent physical resource positions to obtain the control information fed back by the feedback terminal.

In an embodiment, the activation threshold further includes a second threshold. The processing module 620 is further configured to superimpose the n feedback sequences at the m-th physical resource position with superimposition sequences obtained through the (m−1)-th iteration to obtain n updated superimposition sequences, where m is greater than 1 and is less than or equal to the number of physical resource positions; when a power value of the i-th superimposition sequence is greater than the second threshold, subtract the i-th superimposition sequence obtained through the (m−1)-th iteration from the i-th superimposition sequence; when the power value of the i-th superimposition sequence is not greater than the second threshold, compare a sum of a third correlation value corresponding to the i-th superimposition sequence obtained through the (m−1)-th iteration and a fourth correlation value corresponding to the i-th feedback sequence at the m-th physical resource position with the first threshold to determine sent feedback sequences at the m-th physical resource position; when the iteration is completed, determine the control information fed back by the feedback terminal based on the superimposition sequence.

In conclusion, with the apparatus for transmitting a feedback sequence in accordance with embodiments of the disclosure, the feedback sequences are interpreted in the iterative manner, a problem that the sequence received with the lower reception power is overwhelmed by the sequence received with the higher reception power such that the feedback sequence received with the lower reception power cannot be obtained can be avoided. In this way, the accuracy of sending the feedback sequence is improved.

Figure 7:
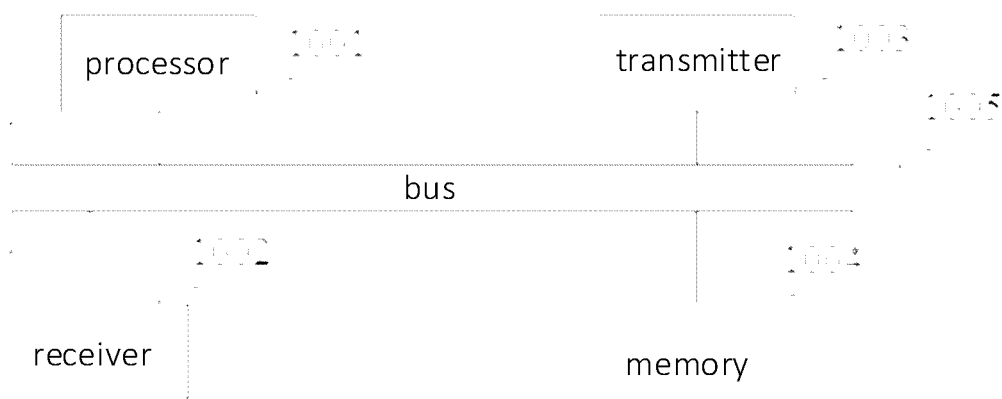
FIG. 7 is a block diagram of a terminal in accordance with an embodiment of the disclosure.

FIG. 7 is a structural diagram illustrating a terminal in accordance with an embodiment of the disclosure. The terminal includes: a processor 1001, a receiver 1002, a transmitter 1003, a memory 1004, and a bus 1005.

The processor 1001 includes one or more processing cores, and the processor 1001 executes various functional applications and information processing by running software programs and modules.

The receiver 1002 and the transmitter 1003 may be implemented as a communication component, which may be a communication chip.

The memory 1004 is connected to the processor 1001 through the bus 1005.

The memory 1004 may be configured to store at least one instruction, and the processor 1001 may be configured to execute the at least one instruction to implement various steps in the above method embodiments.

Additionally, the memory 1004 may be implemented by any type or combinations of volatile or non-volatile storage devices including, but not limited to, magnetic or optical disks, Electrically Erasable Programmable Read Only Memory (EEPROM), Erasable Programmable Read Only Memory (EPROM), Static Random-Access Memory (SRAM), Read Only Memory (ROM), magnetic memory, flash memory, Programmable Read Only Memory (PROM).

In an embodiment, a non-transitory computer-readable storage medium including instructions is also provided, such as a memory including instructions, and the instructions can be executed by the processor of the terminal to execute the method for transmitting a feedback sequence. For example, the non-transitory computer-readable storage medium may be a ROM, a Random-Access Memory (RAM), a CD-ROM, a magnetic tape, a floppy disk, an optical data storage device, and the like.

A non-transitory computer-readable storage medium is provided. When the instructions in the non-transitory computer storage medium are executed by the processor of the terminal, the terminal can execute the above-mentioned method for transmitting a feedback sequence.

An embodiment of the disclosure also provides a system for transmitting a feedback sequence (or communication system). The system includes: a feedback terminal and a receiving terminal; in which, the receiving terminal includes the apparatus for transmitting the feedback sequence in accordance with embodiments as illustrated in FIG. 6; and the feedback terminal includes the apparatus for transmitting the feedback sequence in accordance with embodiments as illustrated in FIG. 5.

An embodiment of the disclosure further provides a computer-readable storage medium, where at least one instruction, at least one piece of program, code set or instruction set is stored in the computer-readable storage medium. The at least one instruction, the at least one piece of program, the code set or the instruction set are loaded and executed by the processor to implement the steps executed by the terminal in the method for transmitting the feedback sequence in accordance with the above method embodiments.

It is understandable that references herein to "a plurality" means two or more. The Term "and/or" describes the association relationship of the associated objects, which means that there can be three kinds of relationships. For example, A and/or B means only A, only B, or both A and B. The character "/" generally indicates that the associated objects are an "or" relationship.

Other embodiments of the disclosure will readily obtained by those skilled in the art upon consideration of the specification and practice of the disclosure. This disclosure is intended to cover any variations, uses, or adaptations of this disclosure that follow the general principles of this disclosure and include common general knowledge or techniques in the technical field not disclosed by this disclosure. The specification and examples are to be regarded as examples only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the disclosure is limited only by the appended claims.

What is claimed is:

1. A method for transmitting a feedback sequence, comprising:
receiving, by a feedback terminal, data on a data channel, wherein the data corresponds to a reception power and a transmission power;
determining, by the feedback terminal, the number of sending times to send a feedback sequence based on the reception power and the transmission power;
determining, by the feedback terminal, a physical resource position for sending the feedback sequence; and
sending, by the feedback terminal, the feedback sequence to a receiving terminal based on the number of sending times at the physical resource position,
wherein the receiving terminal is configured to: receive the feedback sequence at the physical resource position for the feedback sequence, performs a positive correlation operation on n first feedback sequences received at a first physical resource position to obtain a correlation result set, wherein each first feedback sequence corresponds to a first correlation value in the correlation result set, and n is positive integer; compares the first correlation value in the correlation result set with a first threshold, and filters the first feedback sequences to obtain first feedback sequences sent at the first physical resource position; and performs an iterative filtering on the first feedback sequences on the first physical resource position and feedback sequences on subsequent physical resource positions to obtain control information fed back by the feedback terminal.

2. The method of claim 1, wherein determining the number of sending times to send the feedback sequence based on the reception power and the transmission power comprises:
determining a path loss value based on the reception power and the transmission power; and
determining the number of sending times based on the path loss value.

3. The method of claim 2, wherein determining the number of sending times based on the path loss value comprises:
in response to determining that the path loss value is greater than a feedback threshold, determining a first number of sending times as the number of sending times to send the feedback sequence;
or,
in response to determining that the path loss value is not greater than the feedback threshold, determining a second number of sending times as the number of sending times to send the feedback sequence, wherein the first number of sending times is greater than the second number of sending times.

4. The method of claim 1, wherein determining the physical resource position for sending the feedback sequence comprises:
receiving a first configuration signaling sent by an access network device or a receiving terminal, wherein the first configuration signaling comprises an information field configured to indicate the physical resource position.

5. The method of claim 1, wherein determining the physical resource position for sending the feedback sequence comprises:
receiving a second configuration signaling sent by an access network device, wherein the second configuration signaling comprise an information field configured to indicate a correspondence between feedback features and the physical resource positions; and
determining the physical resource position for sending the feedback sequence based on a feedback feature, wherein the feedback feature comprise a distance feature, the number of bytes, or both the distance feature and the number of bytes, the distance feature is configured to represent a distance relationship between the receiving terminal and the feedback terminal, and the number of bytes is configured to represent the number of bytes of the feedback sequence sent by the feedback terminal.

6. A method for transmitting a feedback sequence, comprising:
receiving, by a receiving terminal, feedback sequences at a physical resource position for the feedback sequences; and
obtaining, by the receiving terminal, control information fed back by a feedback terminal based on filtered by the feedback sequences according to an activation threshold, wherein the activation threshold comprises a first threshold;
wherein obtaining the control information fed back by the feedback terminal based on filtered by the feedback sequences according to an activation threshold comprises:
performing a positive correlation operation on n first feedback sequences received at a first physical resource position to obtain a correlation result set, wherein each first feedback sequence corresponds to a first correlation value in the correlation result set, and n is positive integer;
comparing the first correlation value in the correlation result set with a first threshold, and filtering the first feedback sequences to obtain first feedback sequences sent at the first physical resource position; and
performing an iterative filtering on the first feedback sequences on the first physical resource position and feedback sequences on subsequent physical resource positions to obtain the control information fed back by the feedback terminal.

7. The method of claim 6, wherein the activation threshold further includes a second threshold, and iteratively filtering the first feedback sequences on the first physical resource position and the feedback sequence on subsequent physical resource positions to obtain the control information fed back by the feedback terminal comprises:
superimposing n feedback sequences at the m-th physical resource position with superimposition sequences obtained through the (m−1)-th iteration to obtain n updated superimposition sequences, where m is greater than 1 and less than or equal to the number of physical resource positions;
in response to determining that a power value of an i-th superimposition sequence is greater than the second threshold, subtracting the i-th superimposition sequence obtained through the (m−1)-th iteration from the i-th superimposition sequence;

in response to determining that the power value of the i-th superimposition sequence is not greater than the second threshold, compare a sum of a third correlation value corresponding to the i-th superimposition sequence obtained from the (m−1)-th iteration and a fourth correlation value corresponding to the i-th feedback sequence at the m-th physical resource position with the first threshold to determine feedback sequences sent at the m-th physical resource position; and when the iteration is completed, determining the control information fed back by the feedback terminal based on the superimposition sequences.

8. A terminal, comprising:
a processor; and
a transceiver connected to the processor;
in which the processor is configured to load and execute executable instructions to:
receive data on a data channel, wherein the data corresponds to a reception power and a transmission power;
determine the number of sending times to send a feedback sequence based on the reception power and the transmission power;
determine a physical resource position for sending the feedback sequence; and
send the feedback sequence to a receiving terminal based on the number of sending times at the physical resource position,
wherein the receiving terminal is configured to: receive the feedback sequence at the physical resource position for the feedback sequence, performs a positive correlation operation on n first feedback sequences received at a first physical resource position to obtain a correlation result set, wherein each first feedback sequence corresponds to a first correlation value in the correlation result set, and n is positive integer; compares the first correlation value in the correlation result set with a first threshold, and filters the first feedback sequences to obtain first feedback sequences sent at the first physical resource position; and performs an iterative filtering on the first feedback sequences on the first physical resource position and feedback sequences on subsequent physical resource positions to obtain control information fed back by the feedback terminal.

9. A non-transitory computer-readable storage medium, having at least one instruction, at least one program, code set or instruction set stored thereon, wherein the at least one instruction, at least one program, code set or instruction set are loaded and executed by the processor to implement a method for transmitting a feedback sequence of claim 1.

10. The terminal of claim 8, wherein the processor is further configured to:
determine a path loss value based on the reception power and the transmission power; and
determine the number of sending times based on the path loss value.

11. The terminal of claim 10, wherein the processor is further configured to:
in response to determining that the path loss value is greater than a feedback threshold, determine a first number of sending times as the number of sending times to send the feedback sequence;
or,
in response to determining that the path loss value is not greater than the feedback threshold, determine a second number of sending times as the number of sending times to send the feedback sequence, wherein the first number of sending times is greater than the second number of sending times.

12. The terminal of claim 8, wherein the processor is further configured to:
receive a first configuration signaling sent by an access network device or a receiving terminal, wherein the first configuration signaling comprises an information field configured to indicate the physical resource position.

13. The terminal of claim 8, wherein the processor is further configured to:
receive a second configuration signaling sent by an access network device, wherein the second configuration signaling comprise an information field configured to indicate a correspondence between feedback features and the physical resource positions; and
determine the physical resource position for sending the feedback sequence based on a feedback feature, wherein the feedback feature comprise a distance feature, the number of bytes, or both the distance feature and the number of bytes, the distance feature is configured to represent a distance relationship between a receiving terminal and the feedback terminal, and the number of bytes is configured to represent the number of bytes of the feedback sequence sent by the feedback terminal.

14. A terminal, comprising:
a processor; and
a transceiver connected to the processor;
wherein the processor is configured to load and execute executable instructions to implement a method for transmitting a feedback sequence of claim 7.

15. The terminal of claim 14, wherein the activation threshold further includes a second threshold, and iteratively filtering the first feedback sequences on the first physical resource position and the feedback sequence on subsequent physical resource positions to obtain the control information fed back by the feedback terminal comprises:
superimposing n feedback sequences at the m-th physical resource position with superimposition sequences obtained through the (m−1)-th iteration to obtain n updated superimposition sequences, where m is greater than 1 and less than or equal to the number of physical resource positions;
in response to determining that a power value of an i-th superimposition sequence is greater than the second threshold, subtracting the i-th superimposition sequence obtained through the (m−1)-th iteration from the i-th superimposition sequence;
in response to determining that the power value of the i-th superimposition sequence is not greater than the second threshold, compare a sum of a third correlation value corresponding to the i-th superimposition sequence obtained from the (m−1)-th iteration and a fourth correlation value corresponding to the i-th feedback sequence at the m-th physical resource position with the first threshold to determine feedback sequences sent at the m-th physical resource position; and
when the iteration is completed, determining the control information fed back by the feedback terminal based on the superimposition sequences.

16. A non-transitory computer-readable storage medium, having at least one instruction, at least one program, code set or instruction set stored thereon, wherein the at least one instruction, at least one program, code set or instruction set are loaded and executed by the processor to implement a method for transmitting a feedback sequence of claim 6.

\* \* \* \* \*